United States Patent
Engelsma et al.

(10) Patent No.: US 7,751,431 B2
(45) Date of Patent: Jul. 6, 2010

(54) METHOD AND APPARATUS FOR DISTRIBUTED SPEECH APPLICATIONS

(75) Inventors: Jonathan R. Engelsma, Hudsonville, MI (US); James C. Ferrans, Wheaton, IL (US); Michael D. Pearce, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 1048 days.

(21) Appl. No.: 11/027,619

(22) Filed: Dec. 30, 2004

(65) Prior Publication Data
US 2006/0146728 A1 Jul. 6, 2006

(51) Int. Cl.
*H04J 3/16* (2006.01)
(52) U.S. Cl. .................................... 370/466
(58) Field of Classification Search ............ 370/352, 370/252, 241, 253, 276–278, 282, 400, 401, 370/464–467; 704/379, 200, 270, 275
See application file for complete search history.

(56) References Cited

U.S. PATENT DOCUMENTS

| | | | |
|---|---|---|---|
| 5,459,814 A | 10/1995 | Gupta et al. | |
| 5,925,123 A * | 7/1999 | Tremblay et al. | 712/212 |
| 6,157,705 A | 12/2000 | Perrone | |
| 6,304,634 B1 * | 10/2001 | Hollier et al. | 379/22.02 |
| 6,336,137 B1 * | 1/2002 | Lee et al. | 709/219 |
| 6,662,163 B1 | 12/2003 | Albayrak et al. | |
| 6,745,163 B1 | 6/2004 | Brocious et al. | |
| 6,768,720 B1 * | 7/2004 | Kamstra et al. | 370/245 |
| 6,807,395 B2 * | 10/2004 | Iwazaki et al. | 434/350 |
| 6,868,067 B2 * | 3/2005 | Rostron | 370/241 |
| 6,931,263 B1 * | 8/2005 | Boucher et al. | 455/563 |
| 7,003,464 B2 | 2/2006 | Ferrans et al. | |
| 7,421,390 B2 * | 9/2008 | Simpson | 704/270 |
| 2002/0003547 A1 | 1/2002 | Wang et al. | |
| 2002/0080934 A1 * | 6/2002 | Katz | 379/93.02 |
| 2002/0097692 A1 | 7/2002 | Ruotoistenmaki | |
| 2002/0165719 A1 | 11/2002 | Wang et al. | |
| 2002/0165960 A1 * | 11/2002 | Chan | 709/225 |
| 2002/0184373 A1 | 12/2002 | Maes | |

(Continued)

FOREIGN PATENT DOCUMENTS

WO    0219152 A1    3/2002

(Continued)

OTHER PUBLICATIONS

3GPP TR 22.977 V.2.0.0 (Sep. 2002); Technical Specification Group Services and Systems Aspects; Feasibility Study for Speech Enabled Services; (Release 6) 26 pages.

(Continued)

*Primary Examiner*—Dmitry Levitan
(74) *Attorney, Agent, or Firm*—Gary J. Cunningham (57) ABSTRACT

A communication unit (105) includes a communication interface, for transmitting and receiving communications when operably connected to a first communication network; and a processor cooperatively operable with the communication interface. Responsive to receipt of an utterance, the communication unit (105) can perform a fetch (109) over the communication interface and can transmit a first message (107) having the utterance over the communication interface. The communication unit (105) can receive a second message (113) having a result (111) of a recognition of the utterance from the communication interface in response to the fetch (109).

19 Claims, 4 Drawing Sheets

U.S. PATENT DOCUMENTS

| | | |
|---|---|---|
| 2002/0191756 A1 | 12/2002 | Guedalia et al. |
| 2002/0194388 A1 | 12/2002 | Boloker et al. |
| 2003/0130854 A1 | 7/2003 | Galanes et al. |
| 2003/0161298 A1* | 8/2003 | Bergman et al. ............ 370/352 |
| 2003/0200080 A1 | 10/2003 | Galanes et al. |
| 2003/0217127 A1* | 11/2003 | Sinn .......................... 709/223 |

FOREIGN PATENT DOCUMENTS

| | | | |
|---|---|---|---|
| WO | 02079896 A2 | 10/2002 |
| WO | WO 03/071422 A1 | 8/2003 |
| WO | WO 2004/006131 A1 | 1/2004 |

OTHER PUBLICATIONS

Maes et al; SPEECHSC; Internet Draft; "Speech Engine Remote Control Protocols by treating Speech Engines and Audio Sub-systems as Web Services"; Dec. 2002; 22 pages.

Shamugham et al.; Internet Draft; "MRCP: Media Resource Control Protocol"; Jul. 2005.

* cited by examiner

METHOD AND APPARATUS FOR DISTRIBUTED SPEECH APPLICATIONS

FIELD OF THE INVENTION

The present invention relates in general to wireless communication units and wireless networks, and more specifically to supporting multimodal applications including speech on a wireless network.

BACKGROUND OF THE INVENTION

A visually-oriented display device and a keyboard (or keypad) is a familiar approach for a user to provide input/output on computers and other devices. To this visual modality, a voice modality can be added, for example including speech recognition for input and audio playback for output. The result is a multimodal user interface, which can give the user different modes for interacting with the user's device.

Providing multimodal applications on a mobile communication device such as a cellular telephone can be particularly compelling. For example, in some (but not all) instances it is more difficult to operate a mobile communication device using the hands to manipulate the user interface, than it is to speak to the mobile communication device.

As an example, consider a user making flight reservations. Using a multimodal application, the user can speak into a communication device to make flight reservations, and the user can receive both a voice response and a graphical confirmation of the reservation. Another example is where a user requests a map, and is provided a map. Another example application is a voice request for a stock quote, where a graph is provided in return. The level of interaction is more complex than merely typing in a request and receiving an e-mail confirmation or speaking a request to an automated attendant and simply receiving a voice response.

The devices for which multimodal applications can be particularly desirable are mobile and therefore tend to have limited processing and storage power available. A thin client distributed multimodal architecture may be employed on such a resource-constrained device (e.g., a mobile cellular telephone) with audio capture/playback and visual input/output, where the device interfaces with a network based speech recognition server, typically a standard VoiceXML (extensible markup language) platform. Speech recognition is the process of converting spoken words to computer-intelligible information.

There are, unfortunately, no agreed-upon standards for multimodal applications. Hence, multimodal applications tend to use proprietary standards to communicate between the device and the speech recognition server. In addition, there is currently no standard protocol for synchronizing voice and visual presentation over the network. Implementations to date have introduced new custom protocols that involve non-standard modifications to the VoiceXML platform. Not only do non-standard protocols introduce interoperability issues, but also they raise security issues because network operators may need to open their firewalls to allow the new protocol to pass through.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

In overview, the present disclosure concerns communication devices or units, often referred to as communication units, such as cellular telephones or computers and the like having multimodal operating capability, which can be associated with a communication system such as an Enterprise Network, a cellular Radio Access Network, or the like. Such communication units can be wireless or can communicate over wireline connections. Moreover, such communication units can be used in communication systems that further provide services such as voice and data communications services. More particularly, various inventive concepts and principles are embodied in systems, multimodal communication devices, and methods therein for supporting multimodal applications provided to a user by a communication device.

It should be noted that the term communication device may be used interchangeably herein with subscriber unit, wireless subscriber unit, wireless subscriber device or the like. Examples of such devices include personal digital assistants, personal assignment pads, and personal computers equipped for wireless or wireline operation, a cellular handset or device, or equivalents thereof provided such units are arranged and constructed for operation with speech applications. Such a device can be associated with a user and typically a wireless mobile device can be used with a public network, for example in accordance with a service agreement, or within a private network such as an enterprise network.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as one or more processors and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to utilize standard network protocols to synchronize voice and visual views. Instead of introducing a new protocol, the communication device and the voice server can coordinate via an application server.

Further in accordance with exemplary embodiments, and as explained in detail below, a communication device can stream an utterance (i.e., speech made by a user) to the voice server for speech recognition (and perhaps other speech-related processing). Prior to, or immediately after transmitting the utterance, the communication device can send a request, e.g., an HTTP (Hypertext Transfer Protocol) fetch request, to the application server, which will not respond with a result until the voice server posts the result to the same application server. Eventually, the voice server generates a recognition result and sends the result, e.g., via an HTTP post, to the application server. The application server then returns the recognition result (or error) to the communication device as a response to, e.g., the HTTP fetch request.

HTTP support tends to be ubiquitous among communication devices that have network interfaces, and is commonly allowed to traverse firewalls. If desired, the application server and the voice server can be co-located on the same physical platform. Latencies can be further improved by having the communication device fetch aggressively, e.g., by issuing the HTTP fetch to the application server before the user begins to speak. Interactions analogous to the fetch request from other protocols, e.g., HTTPS (HTTP Secure) can be used.

Figure 1:
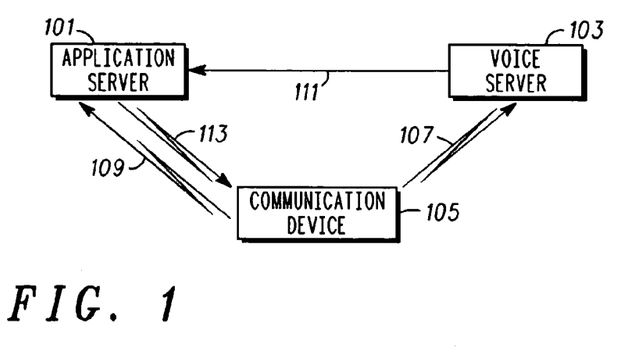
FIG. 1 is a diagram illustrating a simplified and representative environment associated with a communication device running a multimodal application and an exemplary network supporting the multimodal application, in accordance with various exemplary embodiments.

Referring now to FIG. 1, a diagram illustrating a simplified and representative environment associated with a communication device running a multimodal application and an exemplary network supporting the multimodal application, in accordance with various exemplary embodiments, will be discussed and described. A voice server 103 and a communication device 105 can coordinate speech recognition results via request to an intermediary. In the illustrated example, the intermediary is an application server 101.

In the present illustration, the communication device 105 can communicate via, for example, a wireless data packet network. Advantageously, the voice server 103 and the application server 101 can communication with each other on a communication network such as the internet. However, alternative combinations of communication networks are possible. Also, in accordance with one or more alternative embodiments, the communication device 105, the voice server 103 and the application server 101 can communicate with each other via a virtual private network (VPN).

A user can provide an utterance to the communication device 105. The communication device can perform, e.g., an HTTP fetch 109 to the application server 101, optionally on a separate thread of execution. The fetch can indicate the identity of the communication device.

Also, the communication device can send a communication 107 with the utterance to the voice server 103. The communication can include an indication of the identity of the communication device. The voice server 103 can perform speech recognition on the utterance. Optionally, the voice server 103 can perform audio output generation, semantic interpretation, dialog management, and/or other operations associated with the speech recognition.

The voice server 103 can post a message 111 with the result of the recognition to the application server 101, e.g., utilizing HTTP. Utterances generally take place within the context of a session, from which the communication device identity can be determined implicitly. The message 111 can include or be associated with a tag or other implicit or explicit indication corresponding to the identity of the communication device that sent the utterance.

The application server 101 can receive the message 111 with the result. The application server 101 can associate the result to the corresponding communication device, e.g., utilizing the identity from the fetch 109 and the indication from the message 111. Then, the application server 101 can send a message 113 with the result of the speech recognition to the communication device 105.

Upon receipt of the message 113 with the result of the speech recognition, an application program (e.g., a multimodal application, a pure voice application) executing on the communication device 105 can perform further processing such as performing further interactions with the user.

Figure 2:
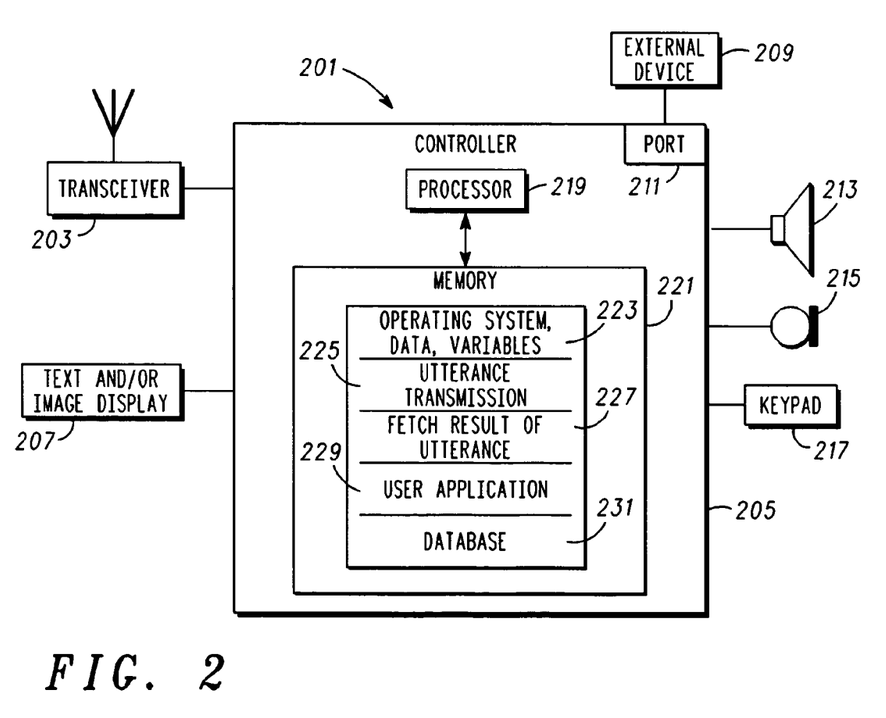
FIG. 2 is a block diagram illustrating portions of an exemplary communication device in accordance with various exemplary embodiments.

Referring now to FIG. 2, a block diagram illustrating portions of an exemplary communication device in accordance with various exemplary embodiments will be discussed and described. The communication device 201 may include all intercoupled as shown, a controller 205, a transceiver 203, a text and/or image display 207, a speaker 213, a microphone 215, and/or a user input device such as a keypad 217. A headset (not shown) may incorporate the speaker 213 and microphone 215. The controller 205 further comprises a communication port 211 for communication with an external device 209, a processor 219, a memory 221, and the like generally intercoupled as depicted. The transceiver 203 is representative of a communication interface, for transmitting and receiving communications when operably connected to a communication network.

The processor 219 may comprise one or more microprocessors and/or one or more digital signal processors. The memory 221 is coupled to the processor 219 and may comprise one or more of a read-only memory (ROM), a random-access memory (RAM), a programmable ROM (PROM), an electrically erasable read-only memory (EEPROM), and/or other memory technologies. The memory 221 may include multiple memory locations for storing, among other things, an operating system, data and variables 223 for overall control of execution of the processor 219; computer programs for causing the processor to operate in connection with various functions such as utterance transmission 225, fetching a result of the utterance 227, a user application 229, and/or other processing (not illustrated); and/or a database 231 for other information, such as applications data and the like used by the processor 219. The computer programs stored in the memory when executed result in the processor 219 controlling the operation of the communication device 201.

The user may input information and can invoke functions accessible through the user input device 217. The user input device 217 may comprise one or more of various known input devices, such as a keypad, a computer mouse, a touchpad, a touch screen, a trackball, and/or a keyboard. The text and/or image display 207 may present, for example, messages or other information, such as received messages and images, to the user by way of a conventional liquid crystal display (LCD) or other visual display. In addition, the processor 219 can prompt the user for the utterance, for example via the display 207 and/or the speaker 213. According to one or more exemplary and alternative embodiments, the processor 219 may be programmed to interact with the user, for example as described above.

The voice input device, e.g., the microphone 213 can be cooperatively operable with the processor 219, and an utterance can be received in connection with the voice input device 213. The processor may be programmed to support transmission of the utterance 225. For example, the microphone 215 can receive an utterance made by the user and can provide the utterance (cooperatively with the processor and corresponding processing circuitry in an appropriate form) to a user application 229 executing on the processor 219. The user application 229 can be, for example, a multimodal or other application utilizing speech to interact with the user, and can interact with a voice server in order to obtain results of speech recognition for further use in connection with the user application 229.

Responsive to receipt of the utterance, the processor 219 can perform a fetch over the communication interface, e.g., the transceiver 203, and can transmit a first message having the utterance over the communication interface, e.g., the transceiver 203. Advantageously, the message with the utterance can be transmitted from the communication device via the conventional technique of streaming, e.g., an audio stream carried over a standard protocol such as RTP (Real-time Transport Protocol). The utterance transmitted from the transmitter can be in any audio format, for example DSR (Distributed Speech Recognition).

In addition, the processor 219 may be programmed for fetching a result of the utterance 227. For example, having sent a fetch request, the processor 219 can receive a second message having a result of a recognition of the utterance from the communication interface 203 in response to the fetch.

In addition, the processor may be programmed to provide a user application 229, e.g., a multimodal application or other application interfacing with the user by modes including speech. Accordingly, one or more embodiments provides that the processor 219 is further configured to facilitate providing the result, responsive to receipt thereof, to the application program 229 executing on the processor 219.

In accordance with one or more embodiments, the fetch can be initiated prior to the transmitting of the message with the utterance. For example, the fetch can be initiated immediately prior to transmitting the message with the utterance, e.g., upon receipt of the utterance, initiated upon prompting an interaction with the user, and/or can be initiated such that a fetch is always outstanding while the user application 229 is executing on the processor 219. Alternatively, the fetch can be initiated subsequent to transmitting the message with the utterance.

A unique identifier can be provided corresponding to the communication unit. For example, this could comprise a call identifier associated with a particular call, a user identifier associated with a particular user, and/or a thread identifier identifying the communication device as well as a particular thread on the communication device. The message having the utterance and the fetch can indicate the unique identifier. Thereby, the fetch and a result of speech recognition of the utterance can be associated together before being transmitted to the communication device.

According to one or more embodiments, the speech recognition and the result are provided via indirection, e.g., the result is provided from a server that did not receive the utterance. Accordingly, the fetch can be directed to a first server, and the transmitting of the message with the utterance can be directed to a second server.

It can be advantageous to provide that messages sent from and received by the communication device are in accordance with standard and/or well-known data exchange protocols, thereby overcoming some of the problems discussed above. Therefore, the fetch and the second message with the result of the fetch can be in accordance with the Hypertext Transfer Protocol (HTTP).

Figure 3:
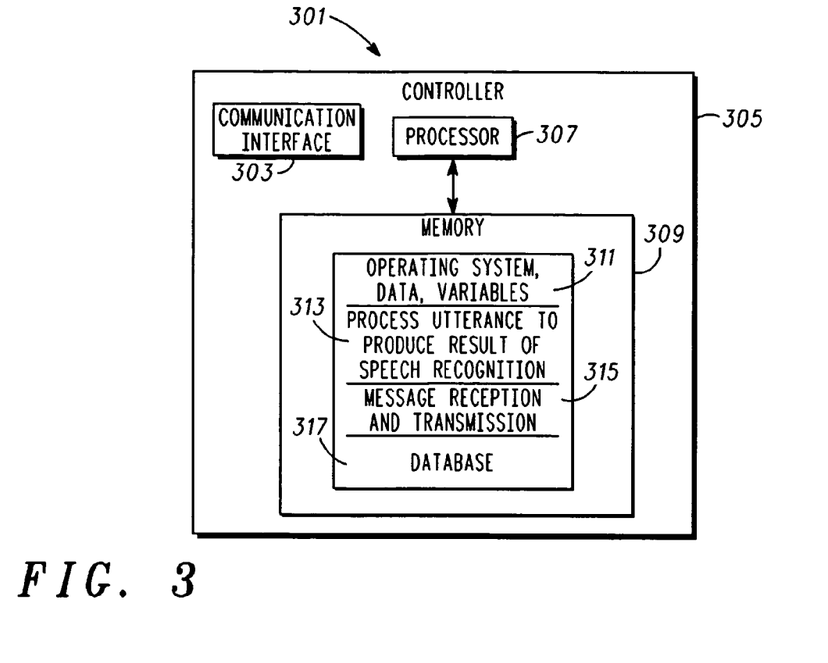
FIG. 3 is a block diagram illustrating portions of an exemplary voice server in accordance with various exemplary embodiments.

Referring to FIG. 3, a block diagram illustrating portions of an exemplary voice server in accordance with various exemplary embodiments will be discussed and described. The voice server 301 may include one or more controllers 305, and a communication interface 303. The controller 305 as depicted generally comprises a processor 307, a memory 309, and may include various other functionality that is not relevant but will be appreciated by those of ordinary skill.

The processor 307 may comprise one or more microprocessors and/or one or more digital signal processors. The memory 309 may be coupled to the processor 307 and may comprise one or more of a read-only memory (ROM), a random-access memory (RAM), a programmable ROM (PROM), an electrically erasable read-only memory (EEPROM) and/or magnetic memory or the like. The memory 309 may include multiple memory locations for storing, among other things, an operating system, data and variables 311 for programs executed by the processor 307; computer programs for causing the processor to operate in connection with various functions such as processing utterances to produce a result of speech recognition 313, message reception and transmission 315, and/or other processing (not illustrated); and a database 317 for other information used by the processor 407. The computer programs when executed by the processor result in the processor 307 controlling the operation of the voice server 301.

Responsive to signaling received from the communication interface 303, or in accordance with instructions stored in memory 309, the processor 307 may handle communications, for example, communications from one or more communication device(s) and/or to one or more application servers. Advantageously, the communication interface can function in accordance with internet protocol ("IP") standards. If desired, one or more communication interfaces can be provided, for example, where the communication device communicates over an alternative network, e.g., a cellular communication network.

The voice server processor 307 may be programmed, for example, to provide speech handling for a communication system, including providing processing of utterances to produce a result of speech recognition 313, and message reception and transmission 315.

The processor 307 can process an utterance to produce a result of speech recognition. A message with an utterance can be received over a communication interface 301 from a communication network. The message can include an indication corresponding to a communication device that originated the utterance. In accordance with one or more embodiments, the message with the utterance is received from the communication device via streaming over the communication network. The processor 307 further can perform, responsive to the first message, speech recognition of the utterance to produce a result of the recognition. The speech recognition can be as desired by an application programmed on the voice server, and can include, if desired, other speech processing functionality.

The processor 307 then can provide the result of the recognition, including the indication. Advantageously, the processor 307 can post a message with the result of the recognition, wherein the message includes the indication. Moreover, in accordance with one or more embodiments, the message can be posted in accordance with a Hypertext Transfer Protocol over a transport control protocol connection.

If the communication device and an application server which is to receive the message are on different networks, the message can be provided to the network on which the application server resides. Accordingly, the message with the result can be posted over the communication network in accordance with the communication interface 303.

Optionally, the voice server 301 can include a dialog manager, e.g., to manage interaction with the user in accordance with ways known in the art. Examples of dialog managers include VoiceXML (extensible markup language), SALT (speech application language tags) and the like. Accordingly, one or more embodiments provides for operating responsive to the result in accordance with the dialog manager.

One or more alternative exemplary embodiments provide that the voice server 301 incorporates functions of the application server. Therefore, the processor 301 can be programmed to provide, in overview, functions including receiving, from the communication device in accordance with the communication interface 303, a fetch having the indication; associating the result with the indication. The message with the result can then posted by the voice server 301 to the communication device corresponding to the indication. More detail on the functions can be ascertained from the exemplary embodiments discussed below.

Figure 4:
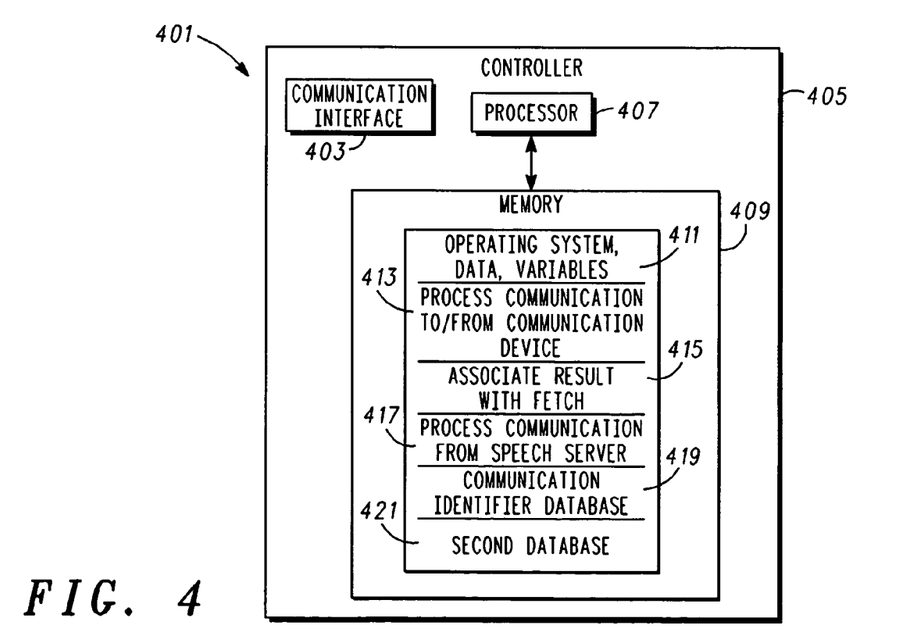
FIG. 4 is a block diagram illustrating portions of an exemplary application server in accordance with various exemplary embodiments.

Referring now to FIG. 4, a block diagram illustrating portions of an exemplary application server 401 in accordance with various exemplary embodiments will be discussed and described. The application server 401 may include one or more controllers 405, and a communication interface 403. The controller 405 as depicted generally comprises a processor 407, a memory 409, and may include various other functionality that is not relevant but will be appreciated by those of ordinary skill.

The processor 407 may comprise one or more microprocessors and/or one or more digital signal processors, suitable to facilitate among others, an HTTP server. The memory 409 may be coupled to the processor 407 and may comprise one or more of a read-only memory (ROM), a random-access memory (RAM), a programmable ROM (PROM), an electrically erasable read-only memory (EEPROM) and/or magnetic memory or the like. The memory 409 may include multiple memory locations for storing, among other things, an operating system, data and variables 411 for programs executed by the processor 407; computer programs for causing the processor to operate in connection with various functions such as processing communications to/from communication device(s) 413, associating results with a particular fetch 415, processing communications from a speech server 417, and/or other processing (not illustrated); a database 419 of communication identifiers; and a second database 421 for other information used by the processor 407. The computer programs when executed by the processor can direct the processor 407 in controlling the operation of the application server 401.

Responsive to signaling received from the communication interface 403, or in accordance with instructions stored in memory 409, the processor 407 may handle communications, for example, communications to/from one or more communication devices and communications from one or more voice servers. As described above in connection with the voice server, the communication interface can function in accordance with internet protocol ("IP") standards.

The processor 407 may be programmed, for example, for providing an application for a communication system. The processor 407 can be cooperatively operable with the communication interface 403 to receive a message over the communication interface 403 from a communication device, the message having a fetch request and a first indication corresponding to a source of the fetch request. The processor 407 can store the first indication in a memory, e.g., the communication identifier database 419 or other appropriate memory location. The processor 407 can wait for a result of voice recognition, such as from the voice server or (optionally) from a voice application operating on the processor. When the result is received, the result (or the message providing the result) has an indication corresponding to a source of the result, i.e., the communication device that sent the utterance for speech recognition. The processor 407 can associate the fetch request with the result, responsive to respective indications. Also, the processor can then transmit, over the communication interface 403 to the communication device, a message with the result as a response to the fetch request.

Generally, the result of the speech recognition can be received from the communication network over the communication interface 403. Optionally, the application server 401 can include a second communication interface (not illustrated), where the voice server and the communication device are on different communication networks or require different communication interfaces. The second communication interface is for receiving communications when operably connected to the different communication network. Accordingly, the result of the speech recognition can be received from a message having a post with the result, where the message is received on the second communication interface.

One or more alternative exemplary embodiments provide that the application server 401 incorporates functions of the voice server. Therefore, the processor 401 can be programmed to provide, in overview, functions including receiving a message from the communication device having an utterance; and responsive to the message, performing speech recognition on the utterance to determine the result.

As described above in connection with the communication device of FIG. 2, the messages to/from the communication device can be in accordance with a Hypertext Transfer Protocol.

Figure 5:
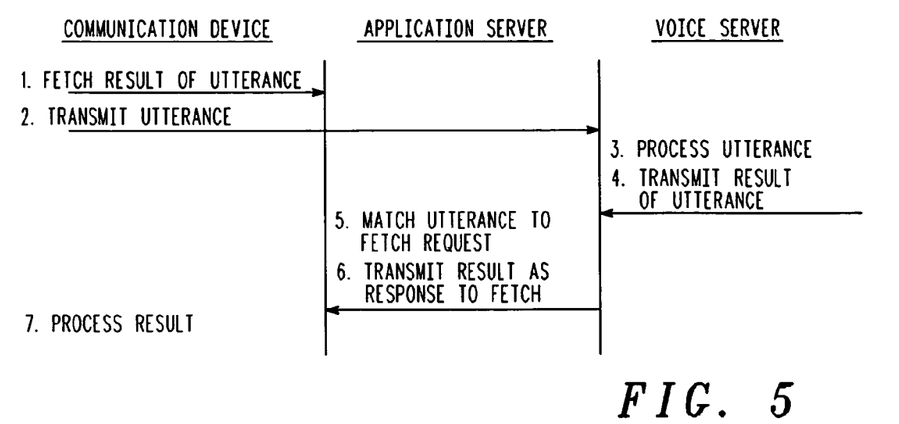
FIG. 5 is a flow diagram illustration of messages between the communication device, the application server, and the voice server, in accordance with various exemplary embodiments.

Referring now to FIG. 5, a flow diagram illustration of messages between the communication device, the application server, and the voice server, in accordance with various exemplary embodiments, will be discussed and described. A communication device receives an utterance from a user, as described above. In response to the utterance, or in anticipation of the utterance, and to obtain a speech recognition result for the utterance, the communication device sends a fetch 1 to the application server to request the result of the utterance.

Also, the communication device transmits 2 the utterance to the voice server. In accordance with one or more embodiments, the communication device establishes a connection, e.g., a session, to the voice server utilizing a known protocol, e.g., SIP (session initiation protocol). SIP provides, among other things, a call identifier (i.e., session identifier) associated with the session and informed to the communication device and the voice server. It can be convenient to use the call identifier as the unique identifier utilized to match the fetch with the result of the speech recognition.

Having received the fetch, the application server can begin to establish a connection to the voice server, e.g., or if the connection is sufficiently established, the connection server can listen for a post from the voice server. Exemplary and alternative exemplary embodiments provide that the fetch 1 and the transmission 2 can be provided in any order. Latencies involved in establishing a connection, e.g., a TCP (Transmission Control Protocol) connection in a wireless network, can take more time than streaming an utterance and obtaining voice recognition results, therefore it can be advantageous to initiate the fetch early, so that the application server can begin to establish a connection to the voice server as soon as possible. The fetch request causes the application server to await a post from the voice server.

Having received the utterance, the voice server can process 3 the utterance, e.g., in accordance with voice recognition and any other desired processing. The voice server can transmit 4 the result of the utterance to the application server.

The application server, upon receiving the result of the utterance, can match 5 the utterance to the fetch request. As explained previously, an indication of the communication device, e.g., a session identifier, can be included in or otherwise associated with the fetch and the utterance, optionally together with any other desired indication so that the particular fetch request can be matched to the result of the corresponding utterance. The application server then transmit 6 the result as a response to the fetch from the communication device.

Upon receipt of the result, the communication device can process 7 the result, as may be indicated by, for example, an application program executing thereon to interact in a multimodal fashion with the user via menus.

As a practical example, consider that the user is in a multimodal mapping application and wishes to retrieve a map for a particular address. The user speaks a particular street address. The communication device transmits a fetch request in accordance with HTTP to the application server 1. The request will be blocked by the application server until the voice server submits a recognition result. The communication device also streams the utterance to the voice server 2.

Once the voice application is initiated on the voice server, the voice server can process the utterance 3, e.g., perform a voice recognition (i.e., the street address), and can interface with, e.g., a map application or appropriate application server to obtain an appropriate image file for the communication device to display, a redirect to an appropriate file, or the content equivalent to the appropriate file.

The voice server submits the recognition result to the application server 4. The application server matches the result of the utterance 5 to the fetch corresponding to the particular communication device. Once the voice server submits the recognition result, with e.g., a textual representation of the recognition result, the application server can have sufficient information also to select an appropriate image file for the communication device to display. The result, possibly including an indication of an image file, can be transmitted as a response to the fetch 6. The communication device receives the result and processes the result 7, providing a display of a map corresponding to the requested address.

Figure 6:
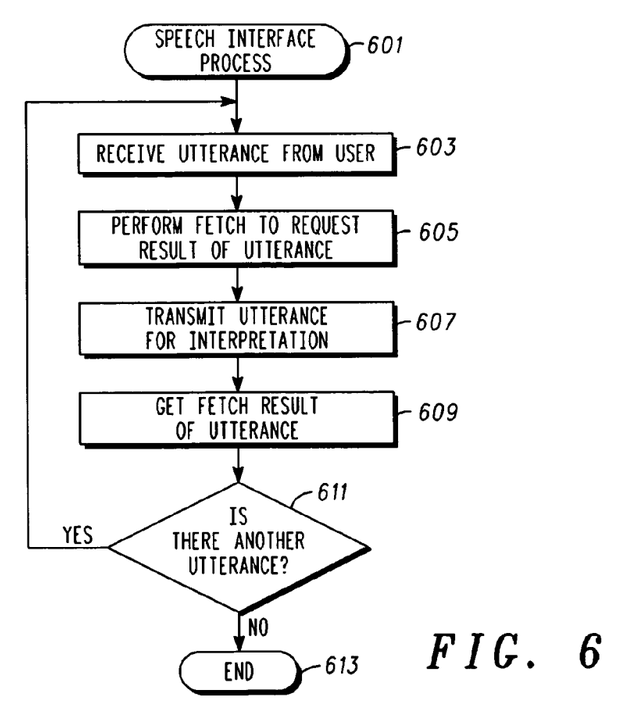
FIG. 6 is a flow chart illustrating an exemplary speech interface process in accordance with various exemplary and alternative exemplary embodiments.
Figure 7:
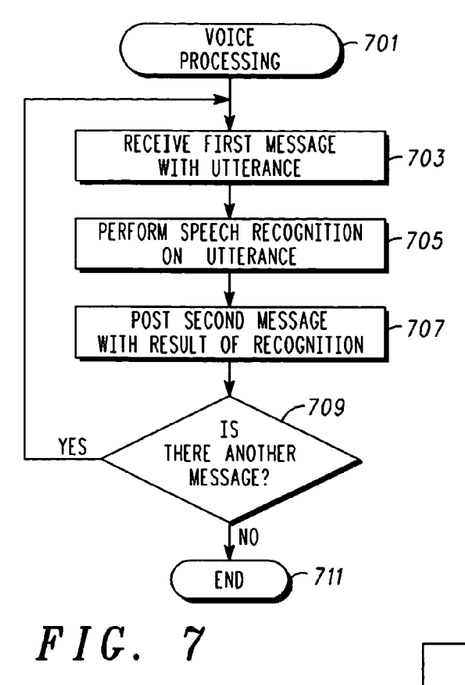
FIG. 7 is a flow chart illustrating exemplary voice processing in accordance with various embodiments.
Figure 8:
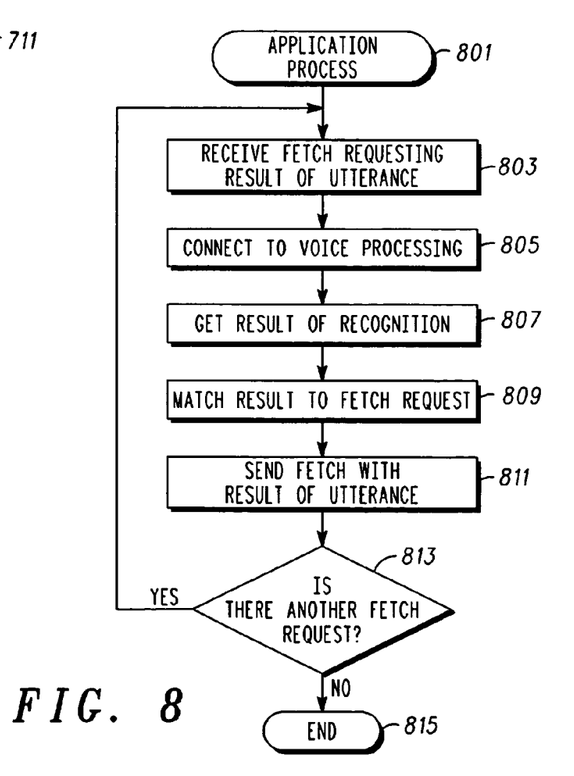
FIG. 8 is a flow chart illustrating an exemplary application process in accordance with various embodiments.

FIG. 6, FIG. 7, and FIG. 8 provide exemplary flow charts corresponding to a speech interface process, voice processing, and an application process, respectively. Each of these is described in more detail below.

Referring now to FIG. 6, a flow chart illustrating an exemplary speech interface process 601 in accordance with various exemplary and alternative exemplary embodiments will be discussed and described. The process can advantageously be implemented on, for example, a processor of a communication device, described in connection with FIG. 2 or other apparatus appropriately arranged.

The speech interface process 601 can include receiving 603 an utterance from a user, in accordance with details provided above. In accordance with one or more embodiments, the process can perform a fetch 605 to request a result of the utterance. As will be understood from above, alternative embodiments provide that the fetch precedes the receipt of the utterance.

The process provides for transmitting the utterance 607 for interpretation, e.g., to a voice server utilizing conventional voice streaming. The process can then await receipt of the result of the utterance, e.g., by getting 609 the fetch result of the utterance. When the result is provided to the process, it has been matched to the particular communication device. If additional specification is provided, e.g., a particular thread that the result is to be associated with, the process can further match the thread to the result.

The process can check whether there is another utterance 611, and if so, can loop to receive the next utterance 603 from the user. If there are no further utterances, or alternatively if the speech application needs no further user input, the process can end 613. Note that the process can be repeated as needed.

Referring now to FIG. 7, a flow chart illustrating exemplary voice processing in accordance with various embodiments will be discussed and described. The processing can advantageously be implemented on, for example, a processor of a voice server, described in connection with FIG. 3 or other apparatus appropriately arranged.

Voice processing 701 can include receiving 703 a first message with the utterance. The processing can including performing 705 speech recognition on the utterance, and optionally any other desired speech processing. The process includes posting 707 a second message with the result of the recognition, as described above. The message can be posted, e.g., to an application server.

The processing can check whether there is another message 709 with an utterance to be processed. If so, the process can loop back to receive the next message with the utterance 703. Otherwise, the process can end 711, however it may be repeated as needed.

Referring now to FIG. 8, a flow chart illustrating an exemplary application process 801 in accordance with various embodiments will be discussed and described. The process can advantageously be implemented on, for example, a processor of an application processor, described in connection with FIG. 4 or other apparatus appropriately arranged.

The process can include receiving 803 a fetch requesting a result of an utterance. As described above, the request can include an indication of the communication device that sent the request. The process can include connecting 805 to the voice processing, e.g., the voice server. Connecting can include establishing a connection over a communication network to the voice processing. If the connection has already been established or is unnecessary, this portion of the process can be omitted. In any event, the process can listen for the results.

The process then awaits the result of the recognition, and gets the result 807 of the recognition. The process matches 809 the result to the fetch request, e.g., by comparing an indicator in the fetch request to an indicator in the result. The process then sends 811 the fetch to the communication device, where the fetch has the result of the utterance.

The process can check whether 813 there is another fetch request to be processed. If so, then the process can receive 803 the fetch requesting another result of another utterance. If there is no other fetch request, however, the process can end 815. Optionally, ending can include terminating the connection between the application process and the voice processing. It is noted that the process may be repeated as needed.

In accordance with the exemplary embodiments described above, it will be appreciated that synchronization between the visual view and the voice view can be provided indirectly utilizing the application server. Moreover, one or more embodiments can be operated with existing standard protocols, which can provide interoperability and reduced security issues.

The communication systems and communication units of particular interest are those providing or facilitating voice communications services or data or messaging services over cellular wide area networks (WANs), such as conventional two way systems and devices, various cellular phone systems including digital cellular, CDMA (code division multiple access) and variants thereof such as W-CDMA (wideband CDMA) and CDMA2000™ (available from Qualcomm), GSM (Global System for Mobile Communications), GPRS (General Packet Radio System), 2.5 G and 3 G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof.

Furthermore the communication units or devices of interest may have short range wireless communications capability normally referred to as WLAN (wireless local area network) capabilities, such as IEEE 802.11, Bluetooth, or Hiper-Lan and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication unit comprising:

a communication interface, for transmitting and receiving communications when operably connected to a first communication network, the first communication network coupled to a first server and a second server; and a processor cooperatively operable with the communication interface, and configured to facilitate, responsive to receipt of an utterance, sending a fetch request over the communication interface, the fetch request directed to the first server and transmitting, separate from the fetch request, a first message having the utterance over the communication interface, the first message directed to the second server; and receiving a second message having a result of a recognition of the utterance from the communication interface in response to the fetch request.

2. The communication unit of claim 1, wherein the first message is transmitted via streaming.

3. The communication unit of claim 1, further comprising a voice input device cooperatively operable with the processor, wherein the utterance is received in connection with the voice input device.

4. The communication unit of claim 1, wherein the fetch request is initiated prior to the transmitting of the first message.

5. The communication unit of claim 1, further comprising a unique identifier, wherein the first message and the fetch request indicate the unique identifier.

6. The communication unit of claim 1, wherein the fetch request is directed to an application server, and the transmitting of the first message is directed to a voice server.

7. The communication unit of claim 1, wherein the processor is further configured to facilitate providing the result, responsive to receipt thereof, to an application program executing on the processor.

8. The communication unit of claim 1, wherein the processor is further configured to facilitate prompting a user for the utterance.

9. The communication unit of claim 1, wherein the fetch request and the second message are in accordance with the hypertext transfer protocol.

10. A method for providing speech handling for a communication system comprising: in a server;

receiving a first message with an utterance over a communication interface from a communication network, wherein the first message includes an indication corresponding to a communication device that originated the utterance, the communication device coupled to the communication network;

performing, responsive to the first message, speech recognition of the utterance to produce a result of the recognition; and posting a second message over the communication network with the result of the recognition, wherein the second message includes the indication and is posted to an application server, the application server coupled to the communication network and differing from the server.

11. The method of claim 10, further comprising wherein the second message is posted in accordance with a hypertext transfer protocol over a transport control protocol connection.

12. The method of claim 10, wherein the second message is posted over the communication network in accordance with the communication interface.

13. The method of claim 10, wherein the first message is received from the communication device via streaming over the communication network.

14. The method of claim 10, further comprising operating responsive to the result in accordance with a dialog manager.

15. The method of claim 10, further comprising
receiving at the application server, from the communication device in accordance with the communication interface, a fetch request having the indication; and
at the application server, associating the result with the indication; and sending, responsive to the fetch request a message corresponding to the result to the communication device corresponding to the indication.

16. A server providing an application for a communication system, comprising:
a communication interface, for transmitting and receiving communications when operably connected to a communication network;
a memory; and
a processor cooperatively operable with the communication interface, and configured to facilitate receiving a first message over the communication interface from a communication device, the first message having a fetch request and a first indication corresponding to a source of the fetch request; storing the first indication in the memory; waiting for a result of a voice recognition performed on an utterance, the result originating from another server, the utterance provided in a message originating from a source of the utterance, the message separate from the first message; receiving the result, the result having a second indication corresponding to the source of the utterance; associating; responsive to the first indication and the second indication, the fetch request with the result; and transmitting, over the communication interface to the communication device, a second message with the result as a response to the fetch request.

17. The server of claim 16, further comprising a second communication interface, for receiving communications when operably connected to a second communication network, wherein the result is received from a third message having a post with the result.

18. The server of claim 16, wherein the result is received from the communication network over the communication interface.

19. The server of claim 16, wherein the first and second message are in accordance with a hypertext transfer protocol.

* * * * *